United States Patent [19]

Eschbach

[11] Patent Number: 5,379,122
[45] Date of Patent: Jan. 3, 1995

[54] DECOMPRESSION OF STANDARD ADCT-COMPRESSED IMAGES

[75] Inventor: Reiner Eschbach, Webster, N.Y.

[73] Assignee: Xerox Corporation, Stamford, Conn.

[21] Appl. No.: 956,128

[22] Filed: Oct. 2, 1992

[51] Int. Cl.$^6$ .............................................. H04N 1/41
[52] U.S. Cl. .................................... 358/426; 358/433; 348/384
[58] Field of Search ............... 358/426, 433, 427, 133, 358/141; 370/100; 348/384, 405

[56] References Cited

U.S. PATENT DOCUMENTS

| | | | |
|---|---|---|---|
| 4,794,455 | 12/1988 | Ericsson | 358/133 |
| 4,974,078 | 11/1990 | Tsai | 358/133 |
| 4,999,705 | 3/1991 | Puri | 358/136 |
| 5,001,559 | 3/1991 | Gonzales et al. | 358/133 |
| 5,049,991 | 9/1991 | Niihara | 358/136 |
| 5,146,326 | 9/1992 | Hasegawa | 358/135 |
| 5,170,264 | 12/1992 | Saito et al. | 358/433 |
| 5,204,756 | 4/1993 | Chevion et al. | 358/426 |
| 5,216,516 | 6/1993 | Tanaka et al. | 358/426 |
| 5,229,864 | 7/1993 | Moronaga et al. | 358/433 |
| 5,231,484 | 7/1993 | Gonzales et al. | 358/141 |
| 5,253,075 | 10/1993 | Sugiyama | 358/433 |
| 5,264,942 | 11/1993 | Shimotsuji et al. | 358/433 |
| 5,295,077 | 3/1994 | Fukuoka | 358/479 |
| 5,321,522 | 6/1994 | Eschbach | 358/433 |
| 5,323,187 | 6/1994 | Park | 348/405 |

OTHER PUBLICATIONS

V. E. Neagoe, "Predictive Ordering Technique & Feedback Transform Coding for Data Compression of Still Pictures"; IEEE Trans. on Communications, vol. 40, No. 2, Feb. 1992, pp. 385–396.

C. Avril et al.; "Linear Filtering for Reducing Blocking Effects in Orthogonal Transform Image Coding"; Journal of Electronic Imaging; vol. 1, No. 2, Apr. 1992, pp. 183–191.

W. H. Chen & C. H. Smith, "Adaptive Coding of Monochrome and Color Images", IEEE Trans. Comm., vol. Com-25, No. 11, Nov. 1977, pp. 1285–1292.

P. G. Roetling, "Visual Performance and Image Coding", Proceedings of the S.I.D., 17/2, pp. 111–114 (1976).

C. Avril et al, "Linear Filtering for Reducing Blocking Effects in Orthogonal Transform Image Coding", Journal of Electronic Imaging, Apr. 1992, vol. 1(2), pp. 183–191.

Rosenholtz et al, "Iterative Procedures for Reduction of Blocking Effects in Tranform Coding", SPIE, vol. 1452, Image Processing Algorithms and Techniques II, (1991), pp. 116–126.

*Primary Examiner*—Edward L. Coles, Sr.
*Assistant Examiner*—Madeleine Nguyen
*Attorney, Agent, or Firm*—Mark Costello

[57] ABSTRACT

A method of decompressing a document image compressed with JPEG ADCT or the like method of compression includes: a) receiving encoded quantized transform coefficient blocks for the original image; b) removing any lossless encoding of the quantized transform coefficient blocks for the original image; c) multiplying each quantized transform coefficient in a block by a corresponding quantizing value from the quantization table to obtain a block of received transform coefficients; d) recovering the image by applying an inverse transform operation to the received transform coefficients; e) reducing high frequency noise appearing in the recovered image as a result of the lossy quantization process, while preserving edges, whereby the appearance of the recovered image is rendered more visually appealing; f) changing the filtered recovered image into blocks of new transform coefficients by the forward transform coding operation using the frequency space transform compression operation; g) comparing each block of new transform coefficients to a corresponding block of received transform coefficients and the selected quantization table, to determine whether the filtered recovered image is derivable from the original image; and h) upon the determination transferring the filtered recovered image to an output buffer.

13 Claims, 12 Drawing Sheets

IMAGE DATA

| 216 | 218 | 215 | 93  | 39  | 145 | 96 | 173 |
|-----|-----|-----|-----|-----|-----|----|-----|
| 218 | 217 | 216 | 122 | 42  | 61  | 61 | 163 |
| 218 | 218 | 217 | 201 | 90  | 41  | 37 | 41  |
| 218 | 218 | 218 | 218 | 214 | 170 | 68 | 53  |
| 218 | 217 | 213 | 146 | 137 | 196 | 99 | 169 |
| 218 | 218 | 212 | 78  | 39  | 130 | 86 | 172 |
| 218 | 218 | 217 | 143 | 47  | 42  | 41 | 49  |
| 218 | 218 | 218 | 214 | 151 | 74  | 43 | 52  |

FIG. 2B

DCT VALUES

| 157 | 430  | 83  | -109 | -34 | -28 | 94  | -41 |
|-----|------|-----|------|-----|-----|-----|-----|
| 10  | -40  | 56  | -18  | -13 | -6  | 22  | -11 |
| -73 | 34   | 63  | -58  | -5  | 21  | -8  | 3   |
| 14  | -116 | 160 | -1   | -75 | -35 | 78  | -16 |
| 108 | -53  | -86 | 72   | 10  | -28 | 9   | -4  |
| -27 | 50   | -52 | 25   | -14 | 22  | -19 | 4   |
| -3  | -3   | 9   | 0    | -8  | 4   | 2   | -5  |
| -22 | 20   | 3   | -14  | -2  | 19  | -8  | -8  |

FIG. 2C

Q-TABLE

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

FIG. 2D

QUANTIZED DCT VALUES USING Q-TABLE

| 10 | 39 | 8 | -7 | -1 | -1 | 2 | -1 |
|---|---|---|---|---|---|---|---|
| 1 | -3 | 4 | -1 | -1 | 0 | 0 | 0 |
| -5 | 3 | 4 | -2 | 0 | 0 | 0 | 0 |
| 1 | -7 | 7 | 0 | -1 | 0 | 1 | 0 |
| 6 | -2 | -2 | 1 | 0 | 0 | 0 | 0 |
| -1 | 1 | -1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 3A

DCT COEFFICIENTS (MULTIPLY FIG. 2C VALUES BY FIG. 2D)

| 160 | 429 | 80 | -112 | -24 | -40 | 102 | -62 |
|---|---|---|---|---|---|---|---|
| 12 | -36 | 56 | -19 | -26 | 0 | 0 | 0 |
| -70 | 40 | 64 | -48 | 0 | -1 | 0 | 0 |
| 14 | -119 | 154 | 0 | -51 | 0 | 80 | -1 |
| 108 | -44 | -74 | 56 | 0 | 0 | 0 | 0 |
| -24 | 35 | -55 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |

FIG. 3B

DECOMPRESSED IMAGE

| 220 | 214 | 220 | 102 | 45 | 137 | 97 | 180 |
|---|---|---|---|---|---|---|---|
| 220 | 231 | 204 | 119 | 37 | 64 | 62 | 145 |
| 204 | 237 | 212 | 192 | 111 | 61 | 25 | 55 |
| 205 | 224 | 225 | 228 | 187 | 156 | 64 | 58 |
| 229 | 207 | 213 | 155 | 133 | 197 | 121 | 165 |
| 224 | 199 | 206 | 96 | 40 | 123 | 74 | 168 |
| 211 | 211 | 213 | 141 | 60 | 66 | 11 | 82 |
| 221 | 234 | 214 | 212 | 143 | 85 | 25 | 53 |

FIG. 5A

Possible Source Images

100
| 216 | 218 | 215 | 93 | 39 | 145 | 96 | 173 |
| 218 | 217 | 216 | 122 | 42 | 61 | 61 | 163 |
| 218 | 218 | 217 | 201 | 90 | 41 | 37 | 41 |
| 218 | 218 | 218 | 218 | 214 | 170 | 68 | 53 |
| 218 | 217 | 213 | 146 | 137 | 196 | 99 | 169 |
| 218 | 218 | 212 | 78 | 39 | 130 | 86 | 172 |
| 218 | 218 | 217 | 143 | 47 | 42 | 41 | 49 |
| 218 | 218 | 218 | 214 | 151 | 74 | 43 | 52 |

→ 108 DCT

102
| 220 | 214 | 220 | 102 | 45 | 137 | 97 | 180 |
| 220 | 231 | 204 | 119 | 37 | 64 | 62 | 145 |
| 204 | 237 | 212 | 192 | 111 | 61 | 25 | 55 |
| 205 | 224 | 225 | 228 | 187 | 156 | 64 | 58 |
| 229 | 207 | 213 | 155 | 133 | 197 | 121 | 165 |
| 224 | 199 | 206 | 96 | 40 | 123 | 74 | 168 |
| 211 | 211 | 213 | 141 | 60 | 66 | 11 | 82 |
| 221 | 234 | 214 | 212 | 143 | 85 | 25 | 53 |

→ DCT

104
| 215 | 217 | 219 | 115 | 50 | 136 | 97 | 193 |
| 217 | 218 | 216 | 111 | 50 | 51 | 53 | 143 |
| 215 | 218 | 216 | 208 | 110 | 52 | 55 | 54 |
| 216 | 217 | 216 | 209 | 190 | 168 | 55 | 65 |
| 218 | 216 | 214 | 142 | 142 | 177 | 124 | 165 |
| 217 | 213 | 211 | 95 | 62 | 129 | 66 | 165 |
| 218 | 214 | 211 | 141 | 64 | 58 | 35 | 66 |
| 222 | 218 | 215 | 214 | 143 | 69 | 42 | 45 |

→ DCT

106
| 217 | 216 | 218 | 115 | 50 | 136 | 97 | 189 |
| 218 | 218 | 212 | 110 | 51 | 53 | 60 | 145 |
| 214 | 224 | 219 | 199 | 115 | 57 | 41 | 52 |
| 213 | 217 | 220 | 218 | 183 | 158 | 58 | 65 |
| 216 | 214 | 214 | 143 | 141 | 192 | 122 | 166 |
| 216 | 212 | 208 | 96 | 55 | 125 | 74 | 166 |
| 217 | 214 | 212 | 142 | 62 | 65 | 18 | 75 |
| 220 | 219 | 218 | 213 | 142 | 74 | 33 | 46 |

→ DCT

DCT Coefficients — 110

| 157 | 430 | 83 | -109 | -34 | -28 | 94 | -41 |
|-----|-----|-----|------|-----|-----|-----|-----|
| 10 | -40 | 56 | -18 | -13 | -6 | 22 | -11 |
| -73 | 34 | 63 | -58 | -5 | 21 | -8 | 3 |
| 14 | -116 | 160 | -1 | -75 | -35 | 78 | -16 |
| 108 | -53 | -86 | 72 | 10 | -28 | 9 | -4 |
| -27 | 50 | -52 | 25 | -14 | 22 | -19 | 4 |
| -3 | -3 | 9 | 0 | -8 | 4 | 2 | -5 |
| -22 | 20 | 3 | -14 | -2 | 19 | -8 | -8 |

→ Quantization (118)

— 112

| 160 | 429 | 80 | -112 | -24 | -40 | 102 | -62 |
|-----|-----|-----|------|-----|-----|-----|-----|
| 12 | -36 | 56 | -19 | -26 | 0 | 0 | 0 |
| -70 | 40 | 64 | -48 | 0 | -1 | 0 | 0 |
| 14 | -119 | 154 | 0 | -51 | 0 | 80 | -1 |
| 108 | -44 | -74 | 56 | 0 | 0 | 0 | 0 |
| -24 | 35 | -55 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |

→ Quantization

— 114

| 163 | 424 | 75 | -112 | -17 | -33 | 89 | -34 |
|-----|-----|-----|------|-----|-----|-----|-----|
| 15 | -42 | 56 | -28 | -13 | -4 | 16 | -6 |
| -68 | 39 | 56 | -57 | 3 | 18 | -5 | -1 |
| 21 | -111 | 144 | -7 | -57 | -37 | 73 | -10 |
| 99 | -50 | -63 | 53 | 3 | -11 | 4 | -8 |
| -12 | 31 | -45 | 17 | -2 | 10 | 0 | -16 |
| 14 | -6 | -6 | -5 | 4 | 9 | -3 | -10 |
| 4 | -3 | 5 | -11 | -4 | 26 | -24 | 6 |

→ Quantization

— 116

| 162 | 424 | 75 | -113 | -19 | -38 | 97 | -42 |
|-----|-----|-----|------|-----|-----|-----|-----|
| 16 | -41 | 57 | -23 | -15 | -1 | 7 | 1 |
| -69 | 40 | 56 | -53 | 6 | 13 | -2 | 0 |
| 21 | -118 | 147 | -4 | -57 | -26 | 69 | -12 |
| 100 | -49 | -68 | 51 | 1 | -3 | 3 | -9 |
| -16 | 39 | -46 | 8 | 3 | 8 | 2 | -17 |
| 10 | -1 | -6 | -3 | 0 | 7 | -5 | -5 |
| 5 | -1 | 0 | -1 | -5 | 9 | -8 | 1 |

→ Quantization

FROM: FIG. 5A

[Left block — 8×8 grid]

| 220 | 214 | 220 | 225 | 102 | 45  | 137 | 97  | 180 |
|-----|-----|-----|-----|-----|-----|-----|-----|-----|
| 220 | 231 | 204 | 224 | 119 | 37  | 64  | 62  | 145 |
| 220 | 237 | 212 | 213 | 192 | 111 | 61  | 25  | 55  |
| 205 | 229 | 224 | 207 | 228 | 187 | 156 | 64  | 58  |
| 229 | 224 | 199 | 206 | 155 | 133 | 197 | 121 | 165 |
| 224 | 211 | 211 | 213 | 96  | 40  | 123 | 74  | 168 |
| 211 | 234 | 212 | 214 | 141 | 60  | 86  | 11  | 82  |
| 221 | 221 |     |     | 212 | 143 | 85  | 25  | 53  |

(220 + 214 + 220 + 220 + 231 + 204 + 204 + 237 + 212) / 9 = 218

(40 + 60 + 66) / 3 = 55

Δ = 32

|155 − 40| > Δ    |96 − 40| > Δ
|131 − 40| > Δ    |123 − 40| > Δ
|197 − 40| > Δ    |141 − 40| > Δ

[Right block — processed grid]

| 217 | 216 | 218 | 218 | 212 | 219 | 220 | 214 | 208 | 212 | 218 | 189 | 145 | 52  | 65  | 166 | 166 | 75  | 46  |
|-----|-----|-----|-----|-----|-----|-----|-----|-----|-----|-----|-----|-----|-----|-----|-----|-----|-----|-----|
| 218 | 214 | 224 | 217 | 214 | 212 | 208 | 212 | 218 | 115 | 110 | 199 | 218 | 143 | 96  | 142 | 213 |     |     |
| 213 | 216 | 214 | 212 | 214 | 219 | 220 | 50  | 51  | 115 | 183 | 141 | 55  | 62  | 142 |     |     |     |     |
| 216 | 217 | 214 | 220 | 136 | 53  | 57  | 158 | 192 | 125 | 65  | 74  |     |     |     |     |     |     |     |
| 220 | 97  | 60  | 41  | 58  | 122 | 74  | 18  | 33  |     |     |     |     |     |     |     |     |     |     |

FIG. 7A

| 201 | 201 | 231 | 209 | 124 | 57  | 51  | 62  | 58  | 15  |
|-----|-----|-----|-----|-----|-----|-----|-----|-----|-----|
| 220 | 220 | 214 | 220 | 102 | 45  | 137 | 97  | 180 | 110 |
| 220 | 220 | 231 | 204 | 119 | 37  | 64  | 62  | 145 | 197 |
| 204 | 204 | 237 | 212 | 192 | 111 | 61  | 25  | 55  | 93  |
| 205 | 205 | 224 | 225 | 228 | 187 | 156 | 64  | 58  | 20  |
| 229 | 229 | 207 | 213 | (155) | 133 | 197 | 121 | 165 | 79  |
| 224 | 224 | 199 | [206] | (96) | 40  | 123 | 74  | 168 | 63  |
| 211 | 211 | 211 | 213 | (141) | 60  | 66  | 11  | 82  | 43  |
| 221 | 221 | 234 | 214 | 212 | 143 | 85  | 25  | 53  | 101 |
| 221 | 221 | 234 | 214 | 212 | 143 | 85  | 25  | 53  | 101 |

FIG. 7B

| 217 | 216 | 218 | 115 | 50  | 137 | 97  | 188 |
|-----|-----|-----|-----|-----|-----|-----|-----|
| 218 | 218 | 212 | 110 | 51  | 53  | 60  | 145 |
| 214 | 224 | 219 | 198 | 115 | 57  | 40  | 52  |
| 213 | 217 | 220 | 219 | 183 | 158 | 59  | 64  |
| 216 | 214 | 214 | 144 | 141 | 192 | 122 | 166 |
| 216 | 212 | [208] | 96 | 55  | 125 | 74  | 166 |
| 217 | 214 | 212 | 142 | 62  | 65  | 18  | 74  |
| 220 | 219 | 218 | 213 | 142 | 74  | 33  | 46  |

FIG. 7C

| 162 | 424 | (74) | -113 | -19 | -38 | 97  | -42 |
|-----|-----|------|------|-----|-----|-----|-----|
| 16  | -41 | 57   | -23  | -15 | -1  | 7   | 1   |
| -69 | 40  | 56   | -53  | 6   | 13  | -2  | 0   |
| (22)| -118| 147  | -4   | -57 | -26 | 69  | -12 |
| 100 | -49 | -68  | 51   | 1   | -3  | 3   | -9  |
| -16 | 39  | -46  | 8    | 3   | 8   | 2   | -17 |
| 10  | -1  | -6   | -3   | 0   | 7   | -5  | -5  |
| 5   | -1  | 0    | -1   | -5  | 9   | -8  | 1   |

FIG. 7D

| 162 | 424 | (75) | -113 | -19 | -38 | 97 | -42 |
|---|---|---|---|---|---|---|---|
| 16 | -41 | 57 | -23 | -15 | -1 | 7 | 1 |
| -69 | 40 | 56 | -53 | 6 | 13 | -2 | 0 |
| (21) | -118 | 147 | -4 | -57 | -26 | 69 | -12 |
| 100 | -49 | -68 | 51 | 1 | -3 | 3 | -9 |
| -16 | 39 | -46 | 8 | 3 | 8 | 2 | -17 |
| 10 | -1 | -6 | -3 | 0 | 7 | -5 | -5 |
| 5 | -1 | 0 | -1 | -5 | 9 | -8 | 1 |

FIG. 7E

| 217 | 216 | 218 | 115 | 50 | (136) | 97 | (189) |
|---|---|---|---|---|---|---|---|
| 218 | 218 | 212 | 110 | 51 | 53 | 60 | 145 |
| 214 | 224 | 219 | (199) | 115 | 57 | (41) | 52 |
| 213 | 217 | 220 | (218) | 183 | 158 | (58) | (65) |
| 216 | 214 | 214 | (143) | 141 | 192 | 122 | 166 |
| 216 | 212 | 208 | 96 | 55 | 125 | 74 | 166 |
| 217 | 214 | 212 | 142 | 62 | 65 | 18 | (75) |
| 220 | 219 | 218 | 213 | 142 | 74 | 33 | 46 |

DECOMPRESSION OF STANDARD ADCT-COMPRESSED IMAGES

The present invention is directed to a method of decompressing images compressed in accordance with the currently proposed JPEG ADCT (adaptive discrete cosine transform) standard, and more particularly, a method of reducing decompression artifacts in document-type images resulting from decompression of standard JPEG ADCT compressed images.

BACKGROUND OF THE INVENTION

Data compression is required in data handling processes, where too much data is present for practical applications using the data. Commonly, compression is used in communication links, where the time to transmit is long, or where bandwidth is limited. Another use for compression is in data storage, where the amount of media space on which the data is stored can be substantially reduced with compression. Yet another application is a digital copier where an intermediate storage for collation, reprint or any other digital copier functions. Generally speaking, scanned images, i.e., electronic representations of hard copy documents, are commonly large, and thus are desirable candidates for compression.

Many different compression techniques exist, and many are proprietary to individual users. However, standards are desirable whenever intercommunication between devices will be practiced. Particularly with the advent of multimedia communication, where formerly dissimilar devices are required to communicate, a common standard will be required. An example is the current desirability of FAX machines to be able to communicate with printers. Currently, compression standards are generally distinct for different devices.

Three major schemes for image compression are currently being studied by international standardization groups. A first, for facsimile type image transmission, which is primarily binary, is under study by the JBIG (Joint Binary Image Group) committee, a second for TV and film, a standard is worked on by the MPEG (Motion Pictures Expert Group). For non-moving general images, i.e., still images which are more general than the ones covered by JBIG, the group JFPEG (Joint Photographic Expert Group) is seeking to develop a device independent compression standard, using an adaptive discrete cosine transform scheme.

ADCT (Adaptive Discrete Cosine Transform, described for example, by W. H. Chen and C. H. Smith, in "Adaptive Coding of Monochrome and Color Images", IEEE Trans. Comm., Vol. COM-25, pp. 1285–1292, November 1977), as the method disseminated by the JPEG committee will be called in this application, is a lossy system which reduces data redundancies based on pixel to pixel correlations. Generally, in images, on a pixel to pixel basis, an image does not change very much. An image therefore has what is known as "natural spatial correlation". In natural scenes, correlation is generalized, but not exact. Noise makes each pixel somewhat different from its neighbors.

Figure 1:
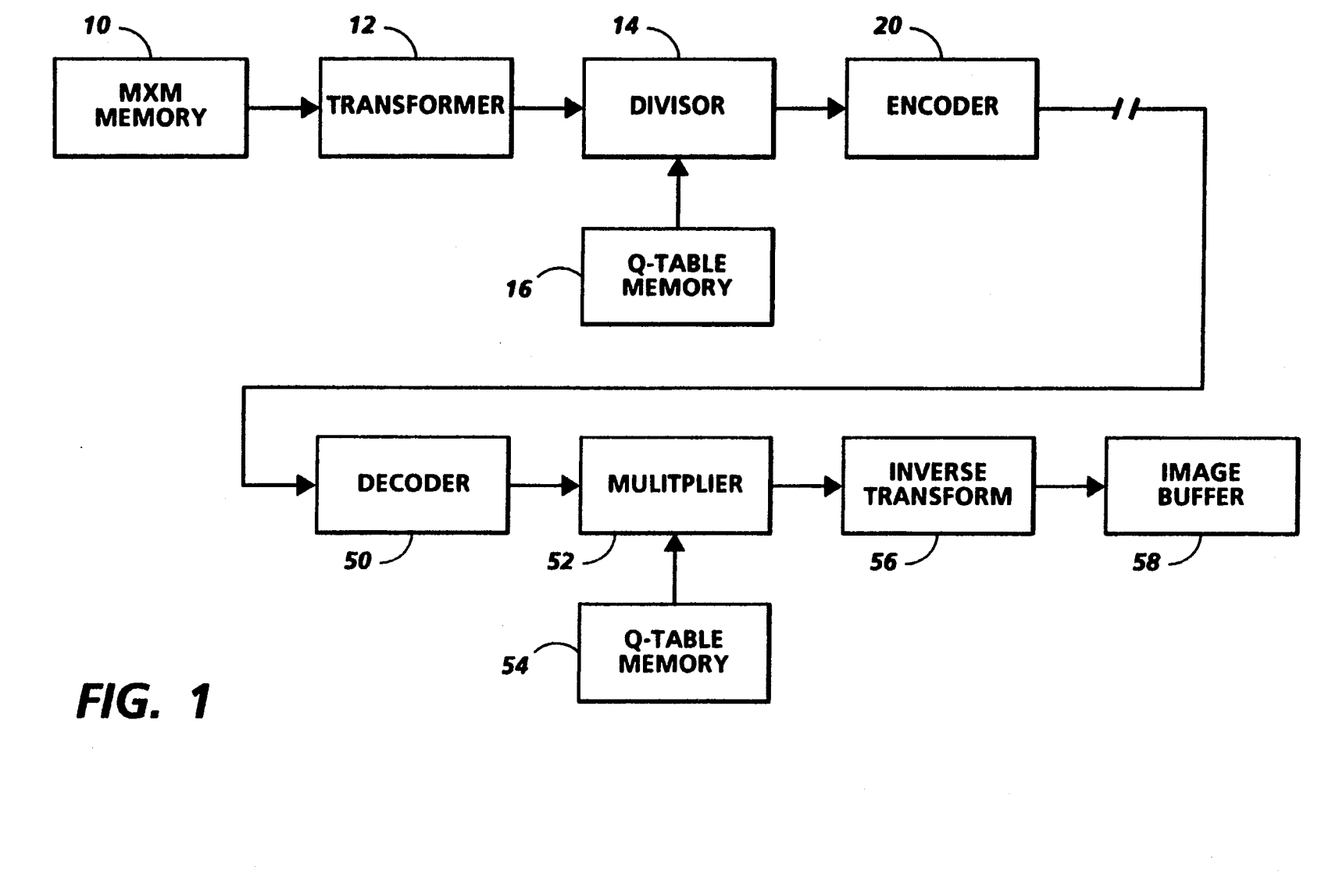
FIG. 1 shows a functional block diagram for the prior art ADCT compression/recompression process.

Generally, as shown in FIG. 1, the process of compression requires a tile memory 10 storing an $M \times M$ tile of the image. We will use square tiles in the description based on the JPEG recommendations, but it has to be noted that the inventive method can be performed with any form of tiling. From the portion of the image stored in tile memory, the discrete cosine transform (DCT), a frequency space representation of the image is formed at transformer 12. Hardware implementations are available, such as the C-Cube Microsystems CL550A JPEG image compression processor, which operates in either the compression or the decompression mode according to the proposed JPEG standard. A divisor/quantization device 14 is used, from a set of values referred to as a Q-Table, stored in a Q table memory 16, so that a distinct Q table value is divided into the DCT value, returning the integer portion of the value as the quantized DCT value. A Huffman encoder 20 using statistical encoding the quantized DCT values to generate the compressed image that is output for storage, transmission, etc.

The current ADCT compression method divides an image into $M \times M$ pixel blocks, where $M=8$. The selection of $M=8$ is a compromise, where the larger the block given, the higher the compression ratio obtainable. However, such a larger block is also more likely to have non-correlated pixels with n the block, thereby reducing the compression ratio. If the block was smaller, greater correlation within the block might be achieved, but less overall compression would be achieved. Particularly within a document image, edges of the image are more likely to be encountered within an $8 \times 8$ block, than would be the case for a scene forming a natural image. Thus, the assumption of spatial correlation fails to some extent. A major problem addressed by the present invention, and as will become more apparent hereinbelow, is that the assumptions of the ADCT proposal work well for photographs containing continuous tones and many levels of gray pixels, but often work poorly for the reproduction of document images, which have significant high frequency components and many high contrast edges.

Compression schemes tend to use a set of basis functions to utilize the intra block correlations. Basis functions define the data as a projection onto a set of orthogonal functions on an interval. ADCT uses cosine functions as the basis functions and the Discrete Cosine Transform (DCT) as the projection step, In the first step of the ADCT standard, the image is tiled into $8 \times 8$ blocks. Within each block, a set of 64 DCT coefficients is determined for the pixels in the block. The DCT coefficients represent the coefficients of each cosine term of the discrete cosine transform of the $8 \times 8$ block.

Figure 2A:
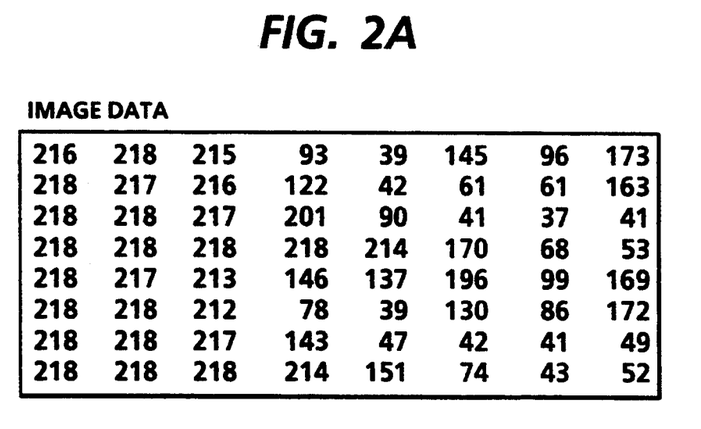
FIG. 2A shows an 8×8 block of image data to be compressed.

Referring now to FIG. 2A, an array of 64 gray level values representing 64 pixels in an $8 \times 8$ block of the image is shown. This $8 \times 8$ block is transformed according to the JPEG ADCT specifications giving the DCT coefficients shown in FIG. 2B. These coefficients still completely describe the image data of FIG. 2A, but in general larger values will now cluster at the top left corner in the low spatial frequency region. Simultaneously, in the vast majority of images as the frequency of the image increases, the coefficient values in the lower right hand portion of the grid tend towards zero.

Generally, the human eye tends to see low frequencies in an image best. At higher frequencies, changes from amplitude to amplitude are unnoticeable, unless such changes occur at extremely high contrast. This is a well known effect of the Human Visual System and extensively documented, see e.g. "Visual Performance and Image Coding" by P. Roetling, *Proceedings of the S.I.D.* 17/2 pp. 111–114 (1976). The ADCT method makes use of the fact that small amplitude changes at high frequencies can be generally ignored.

Figure 2B:
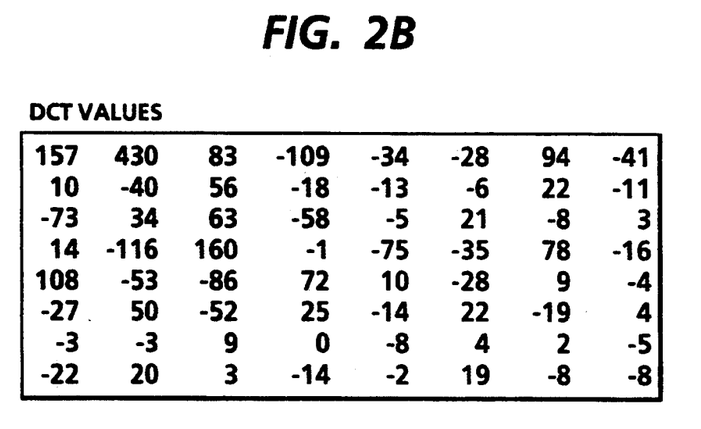
FIG. 2B shows the discrete cosine values as determined, giving a frequency space representation of the image of FIG. 2A.
Figure 2C:
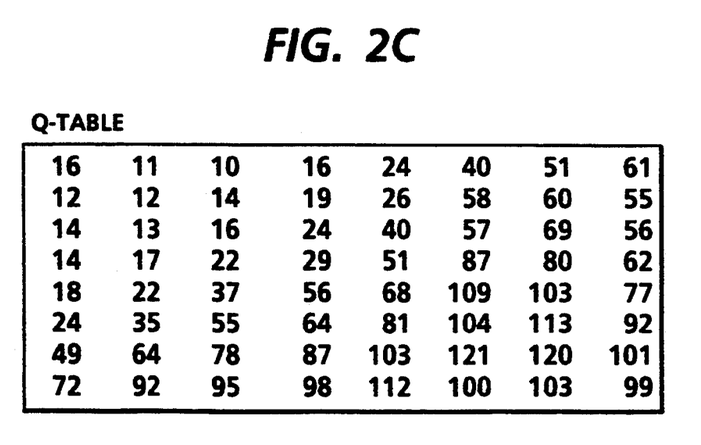
FIG. 2C shows the default Q-Table used in the examples.

The next step in the ADCT method involves the use of a quantization or Q-matrix. The Q-matrix shown in FIG. 2C is a standard JPEG-suggested matrix for compression, but ADCT as well as the proposed inventive method can also operate using other Q-matrices (or Q-Tables). The matrix incorporates the effect that lower frequencies are roughly more important than high frequencies by introducing generally larger quantization steps, i.e. larger entries, for larger frequencies. However, the table also attempts to internally construct some desirable variations from the general assumption. Accordingly, the values in the table do vary with frequency, where the exact variation might be a function of the human visual system, of the document type expected, i.e.: photo, text, graphic, etc., or of some other application dependent parameter. Each of the DCT values from FIG. 2B is divided by a corresponding Q-matrix value from FIG. 2C giving quantized DCT (QDCT) values by way of:

$$QDCT[m][n] = INT\{DCT[m][n] \div Q\text{-Table}[m][n] + \tfrac{1}{2}\}$$

where INT{A} denotes the integer part of A

The remainder from the division process is discarded, resulting in a loss of data. Here and in the following we use the term division to describe the process detailed in ADCT including the methods for handling truncation and round-off. Furthermore, since the Q values in the lower right hand portion of the table tend to be high, most of the values in that area go to zero, unless there were extremely high amplitudes of the image at the higher frequencies.

Figure 2D:
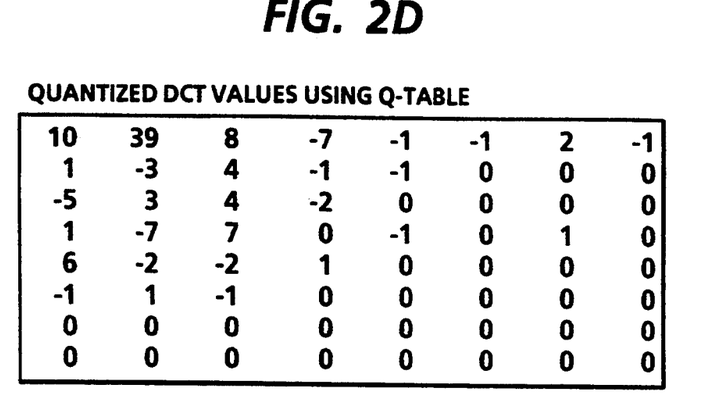
FIG. 2D shows the quantized discrete cosine values as determined.

After deriving the quantized set of DCT values, shown in FIG. 2D, pixels are arranged in the order of a space filling zigzag curve and a statistical encoding method, such as the Huffman process, is used to generate the transmitted signal. This statistical coding is performed in a lossless way and the only loss introduced in the compression is the one generated by the quantization of the DCT coefficients using the Q-Table.

ADCT transforms are well known, and hardware exists to perform the transform on image data, e.g., U.S. Pat. No. 5,049,991 to Nihara, U.S. Pat. No. 5,001,559 to Gonzales et al., and U.S. Pat. No. 4,999,705 to Puri. The primary thrust of these particular patents, however, is moving picture images, and not document images.

To decompress the now-compressed image, and with reference to FIG. 1, a series of functions or steps are followed to reverse of the process described. The Huffman encoding is removed at decoder 50. The image signal now represents the quantized DCT coefficients, which are multiplied at signal multiplier 52 by the Q table values in memory 54 in a process inverse to the compression process. At inverse transformer 56, the inverse transform of the discrete cosine transform is derived, and the output image in the spatial domain is stored at image buffer 58.

Figure 3A:
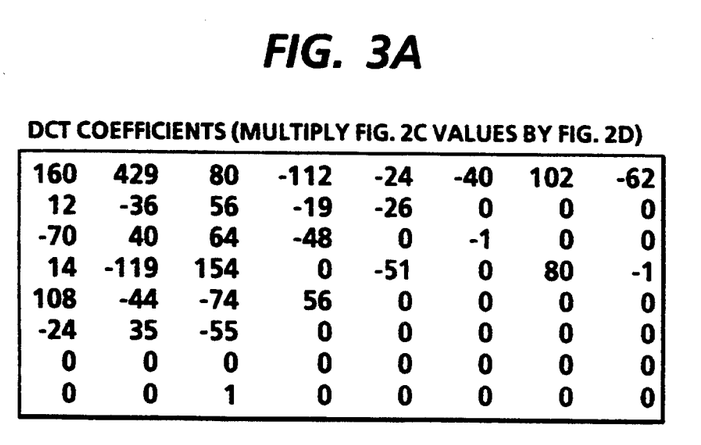
FIG. 3A shows the DCT values regenerated from the data of FIG. 2A by use of the Q-Table of FIG. 2C.

In the described decompression method, Huffman encoding is removed to obtain the quantized DCT coefficient set. Each member of the set is multiplied by a Q-Table value resulting in the DCT coefficients shown in FIG. 3A by using the data of FIG. 2C and 2D by ways of:

$$DCT[m][n] = QDCT[m][n] \times Q\text{-Table}[m][n].$$

Figure 3B:
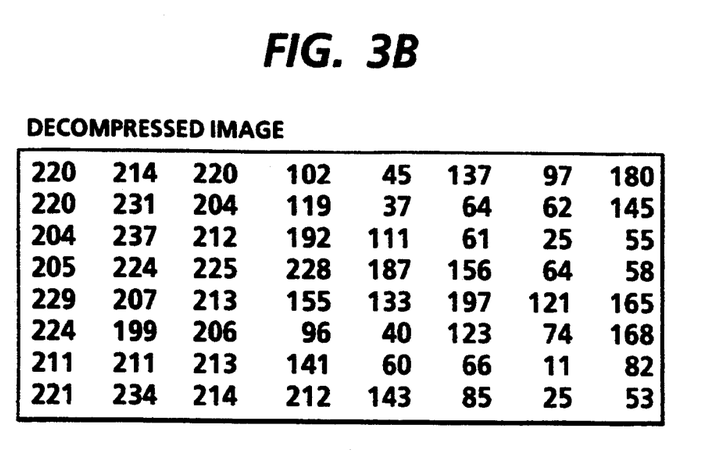
FIG. 3B shows the corresponding 8×8 reconstructed image data block.

However, the result shown in FIG. 3A is not the original set of DCT coefficients shown in FIG. 2B, because the remainders calculated for the original quantization of the DCT coefficients with the Q-Table in the compression process have been lost. In a standard ADCT decompression process, the inverse discrete cosine transform of the set of DCT coefficients is derived to obtain image values shown in FIG. 3B.

The described process does not work to reproduce the best images. Clearly, it cannot reproduce the original image, since data within the image was discarded in the compression-quantization step. Failures are noted wherever strong edges, commonly present in text, appear. Particularly, at such edges "ringing artifacts" or in some references, "mosquito noise" is noted. These problems occur in text, graphics and halftones, components very common in document images. In addition to mosquito noise or ringing artifacts, a blocking artifact often appears associated with image areas with slowing varying grays, where each M×M block which formed the calculation of the compression basis appears visible. In either case, a problem has occurred.

In order to remove the artifacts noted, two methods of attacking the problem have been attempted. In a first method, the decompressed image is post processed, i.e., after the image has been fully decompressed, an attempt is made to improve the image. Of course, such processing can never go back to the original image, because that image has been lost. Such processes are demonstrated in the article "Reduction of Blocking Effects in Image Coding" by Reeve, III et al., Optical Engineering, January/February, 1984, Vol. 23, No. 1, p. 34, and "Linear Filtering for Reducing Blocking Effects in Orthogonal Transform Image Coding", by C. Avril et al., Journal of Electronic Imaging, April 1992, Vol. 1 (2), pp. 183–191. However, this post-processing of the image leads to a reconstruction that could not have been the real source image and subsequent compression/decompression steps as they are possible in electronic imaging applications will lead to potentially larger and larger deviations between reconstruction and original.

Another approach to the problem is through an iterative decoding process using the known bandlimit of the data. In this method, using the compressed form of tile image again, different blocks, perhaps 32×32, are used to decode the image. In one example, "Iterative Procedures for Reduction of Blocking Effects in Transform Image Coding", by R. Rosenholtz et al., SPIE, Vol. 1452, Image Processing Algorithms and Techniques II, (1991), pp. 116–126, a method of blurring the overall image was considered, with the hope that such blurring would tend to smooth out the block artifacts noted above.

All of the references cited herein above are incorporated by reference for their teachings.

SUMMARY OF THE INVENTION

In accordance with the invention, there is provided a method of decompressing a compressed document image, wherein the decompressed image is filtered, and the filtered image is compared to the set of images derivable from the original image, before compression, to reduce image noise and assure that the decompressed image is within a known range of images.

In accordance with one aspect of the invention, there is provided a method of improving the appearance of a decompressed document image while maintaining fidelity with an original document image from which it is derived, wherein for compression, an original document image is divided into blocks of pixels, the blocks of pixels are changed into blocks of transform coefficients by a forward transform coding operation using a frequency space transform compression operation, the transform coefficients subsequently quantized with a lossy quantization process in which each transform coefficient is divided by a quantizing value from a quantization table and the integer portion of a result is used as a quantized transform coefficient, and the blocks of quantized transform coefficients are encoded with a lossless encoding method, the method including the decompression steps of: a) receiving the encoded quantized transform coefficient blocks for the original image; b) removing any lossless encoding of the quantized transform coefficient blocks for the original image; c) multiplying each quantized transform coefficient in a block by a corresponding quantizing valise from the quantization table to obtain a block of received transform coefficients; d) recovering the image by applying an inverse transform operation to the received transform coefficients; e) with a selected filter, reducing high frequency noise appearing in the recovered in,age as a result of the lossy quantization process, while preserving edges, whereby the appearance of the recovered image is rendered more visually appealing; f) changing the filtered recovered image into blocks of new transform coefficients by the forward transform coding operation using the frequency space transform operation; g) comparing each block of new transform coefficients to a corresponding block of received transform coefficients and the selected quantization table, to determine whether the filtered recovered image is derivable from the original image; and h) upon the determination transferring the filtered recovered image to an output buffer.

In accordance with another aspect of the invention, in such a decompression process, step g) may include the additional steps of: 1) determining that the block of new transform coefficients is not derivable from the original image; and 2) altering individual new transform coefficients, so that a block of altered new transform coefficients is derivable from the original image, 3) recovering the image from the blocks of altered new transform coefficients.

In accordance with still another aspect of the steps e-g may be repeated iteratively until a selected condition occurs. Possible selected conditions are i) a number of iterations, ii) no corrections are required to the transformed image, or iii) no changes have been made in successive iterations to the inverse transformed image.

By altering the decompression process, as opposed to altering the compression process, integrity and compatibility with the JPEG standard process are maintained independent on the number of compression/decompression cycles the document image data undergo. Additionally, the process can be selectively used, based on the image input, and whether improvements can be made using the inventive decompression process.

These and other aspects of the invention will become apparent from the following descriptions to illustrate a preferred embodiment of the invention read in conjunction with the accompanying drawings in which:

DETAILED DESCRIPTION OF THE INVENTION

Figure 4:
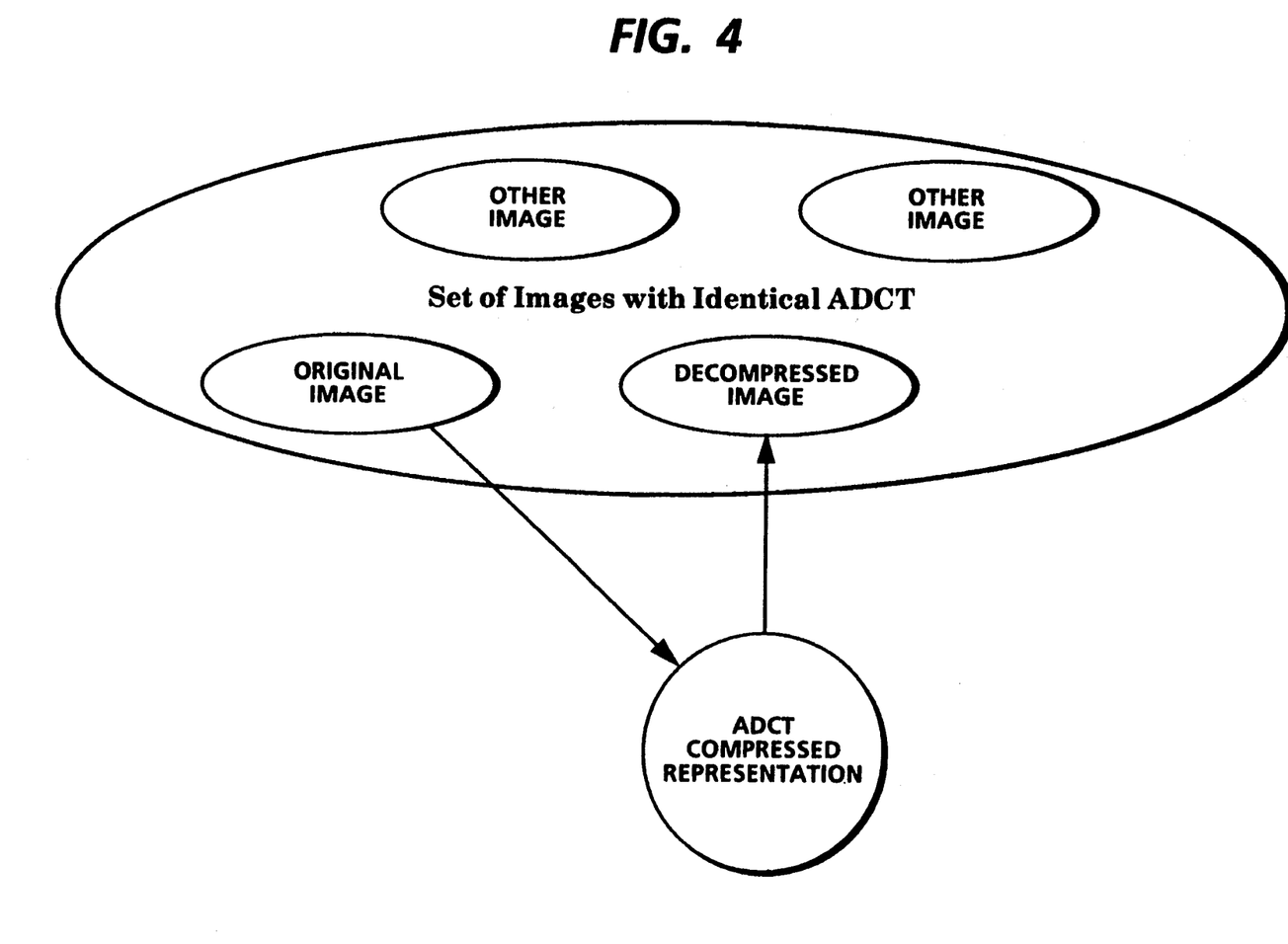
FIG. 4 shows the principle of a single set of quantized ADCT values representing a class of distinct and possible images.

Referring now to tile drawings where the showings are for the purpose of describing an embodiment of the invention and not for limiting same, we note initially, that while it is impossible to return to the exact image which was compressed originally in the compression process, because data has been lost in the compression process, it is possible to return to an image which is similar in some respect to the original compressed image, as will be further described with respect to the present invention, hereinafter. Secondly, it is possible to correct the basic image defects that are appearing in the image. With reference now to FIG. 4, a general overview of the compression/decompression process is shown. There exists a set of images which are distinct from each other, but which are similar in the respect that each image in the set compresses to the same ADCT representation. Therefore, any decompression process should produce an output image which is within this set. The knowledge of the set of possible images is coded by the Q-Table used. Since the Q-Table represents divisors of the discrete quantized transform coefficients, and as a result of the quantization process fractional portions of each coefficient are discarded, then tile set of possible images represents all those images from which the same quantized transform coefficients can be determined about a range of possible coefficient values for each term of the transform.

Figure 5A:
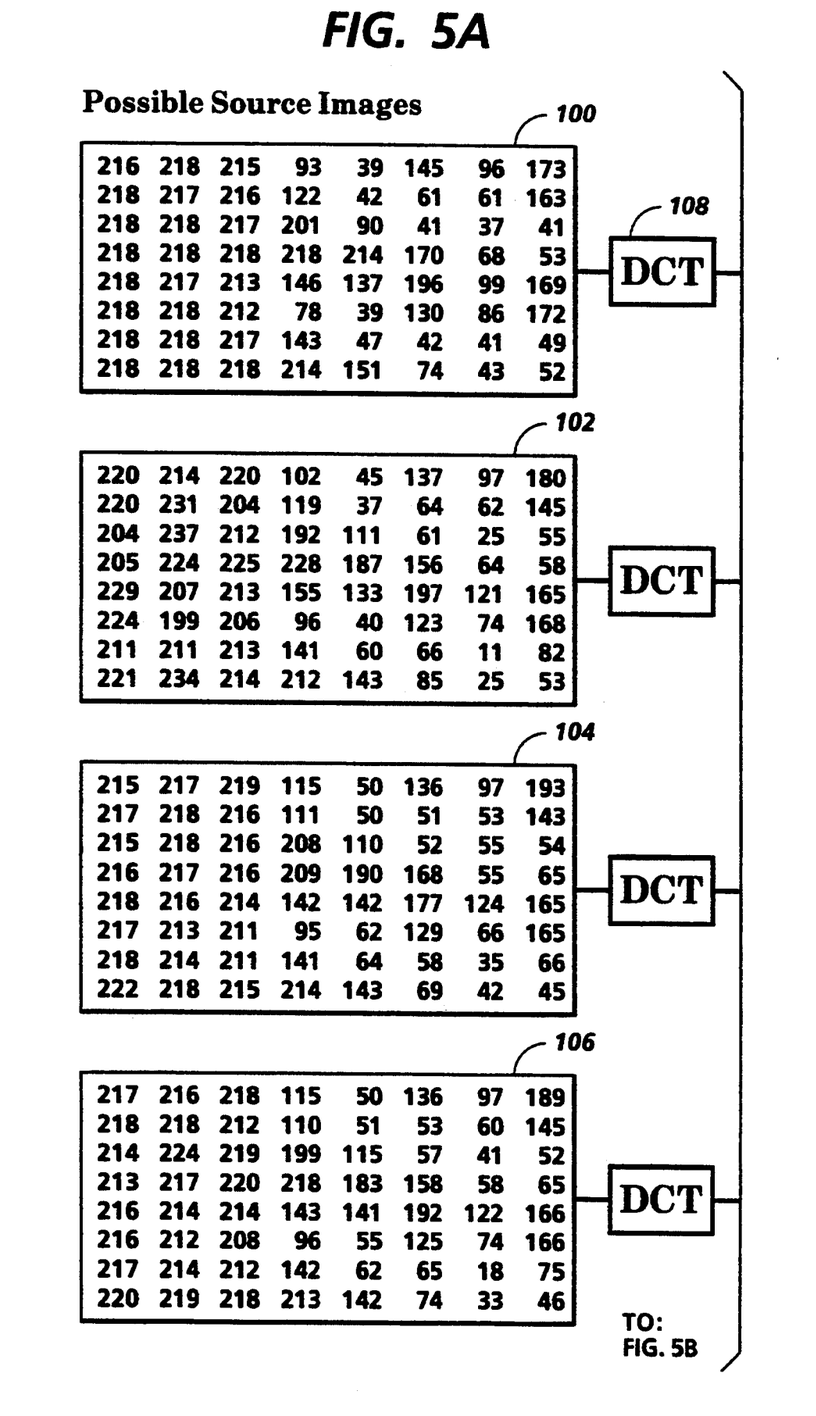
FIGS. 5A-C show numerical examples for the case of a multiple source image being represented by a single set of quantized ADCT value.
Figure 5B:
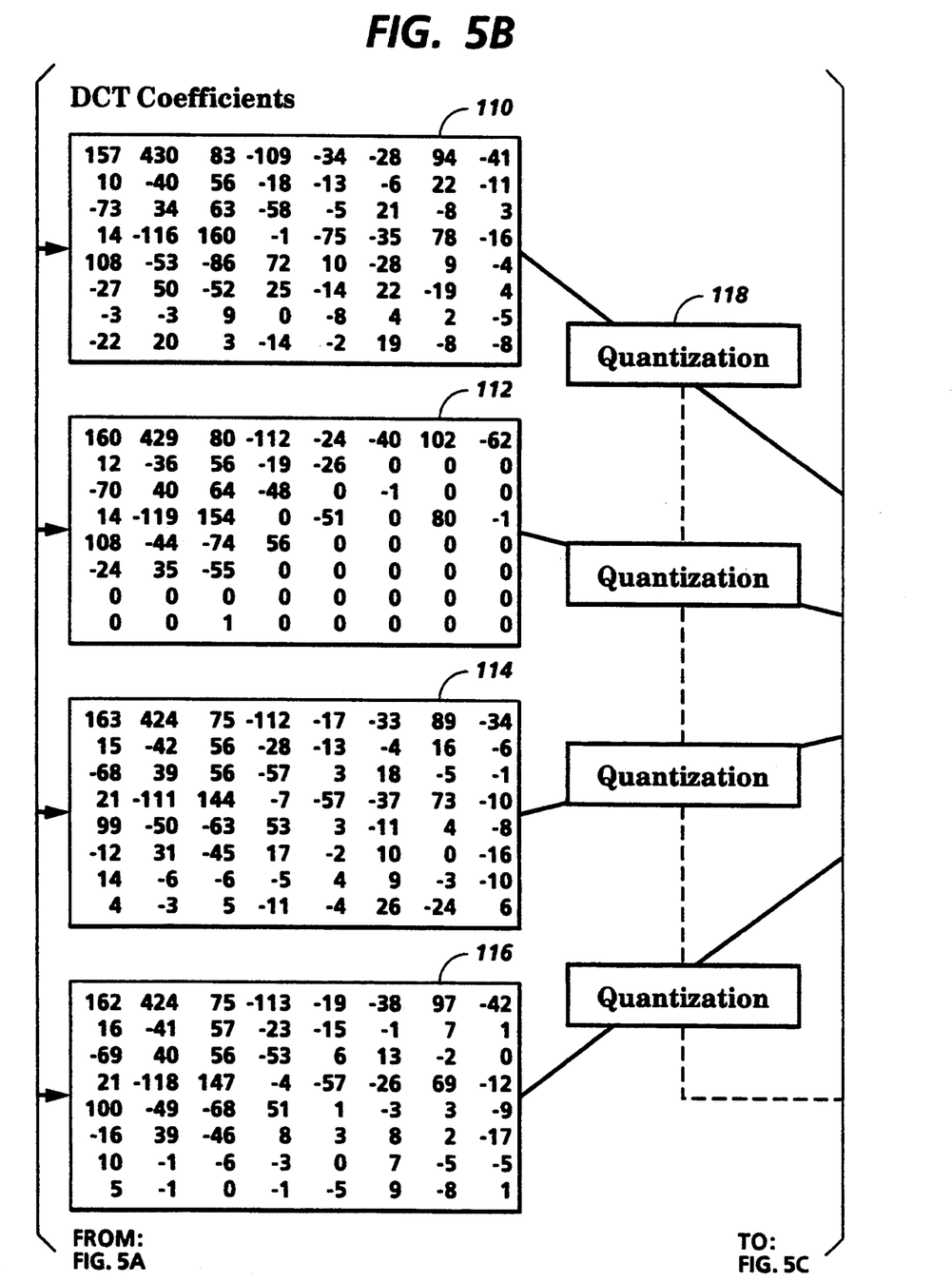
Figure 5C:
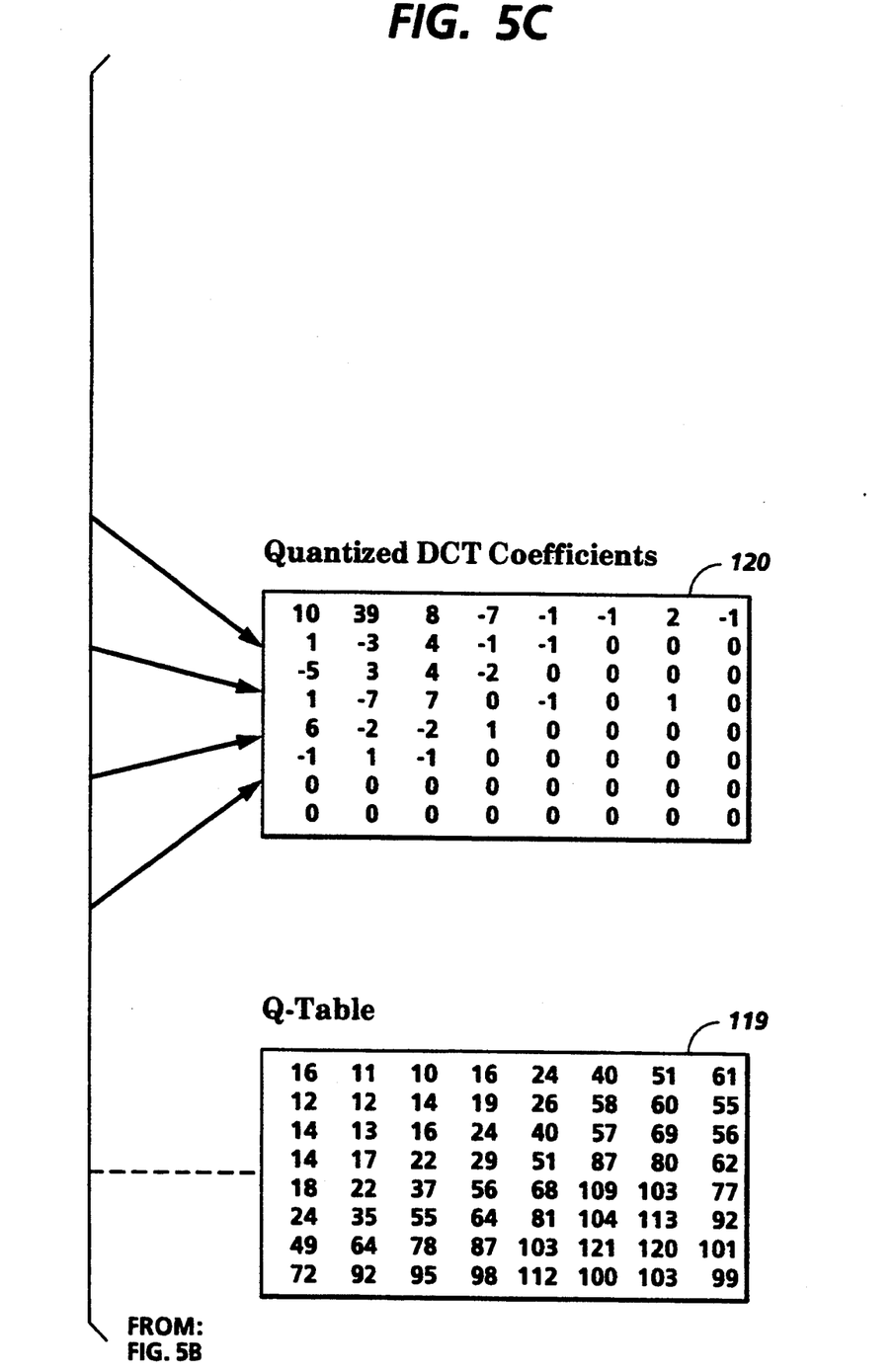

With reference now to FIG. 5A, a set of possible source images 100, 102, 104 and 106, each consisting of image signals having a gray density value, ranging between 0 and 256 for the example, followed by their corresponding DCT coefficients as a result of the DCT conversion (for this illustration, illustrated as the DCT 108. These images represent portions of document images, generated by scanning an original document with an input scanner or created an electronic document on a computer, etc. As can be seen, the images are distinct and the DCT coefficients 110, 112, 114 and 116 shown in FIG. 5B are distinct. The DCT coefficients are quantized at quantization 118 using the corresponding entries in the Q-Table 119 shown in FIG. 5C. In this example The top left entry of the DCT coefficients is divided by the top left entry [16] in the Q-Table. Using a rounding operation for the fractional part, the result for those coefficients are in set 110, 157/16 = 9.81 rounds to 10,
in set 112. 160/16 = 10
in set 114, 163/16 = 10.19 rounds to 10, and
in set 116 162/16 = 10.13 rounds to 10.

All of the top left entries in the table of DCT coefficients are therefore mappable to the same quantized DCT coefficients (set 120 shown in FIG. 5C) using this Q-Table The same is true for all other DCT coefficients shown in FIG. 5A. The compressed data of set 120, therefore describes a set of possible source images rather than a unique source image with a subset of those possible source images shown in FIG. 5A. The determination that an 8×8 image block is a possible source of the quantized DCT coefficients can be derived by considering the fact that the Q-Table entries define the quantizers and therefore the accuracy of the DCT coefficients. In the example given in FIG. 5B the top left entry is bounded by $153 \leq entry \leq 168$, spanning 16 values, any value in that range can be used as DCT coefficient without altering the compressed data. It is this "non-uniqueness" that is utilized in the inventive method, by selecting a possible source image that is i) a possible source image conforming with the compressed data and ii) an image that conforms to the model of a document image. In this way the inventive method differs from previous methods in which the ultimate image derived, does not conform to the compressed data as in post litering methods, or does not use a source image model to restrict the decompression, but rather used a sampling consideration to blur the image.

In order to define an expectation for the input document image, it is noted that the image problem that results from the decompression process is ringing, or high frequency noise. Elimination of the high frequency noise is desirable, requiring a low pass filter. Unfortunately, the ringing occurs at edges, which are very common and important in document images. Accordingly, since edges represent high frequencies, which should not be removed, a simple low pass filter is not adequate, because it would destroy the edge information, i.e.: the readability of characters or the definition of lines, along with the reduction of noise. Rather, a low pass filter that preserves edges is required. Such a filter is a non-linear filter which might be an order statistical filter (or median filter), a sigma filter or the like.

Figure 6:
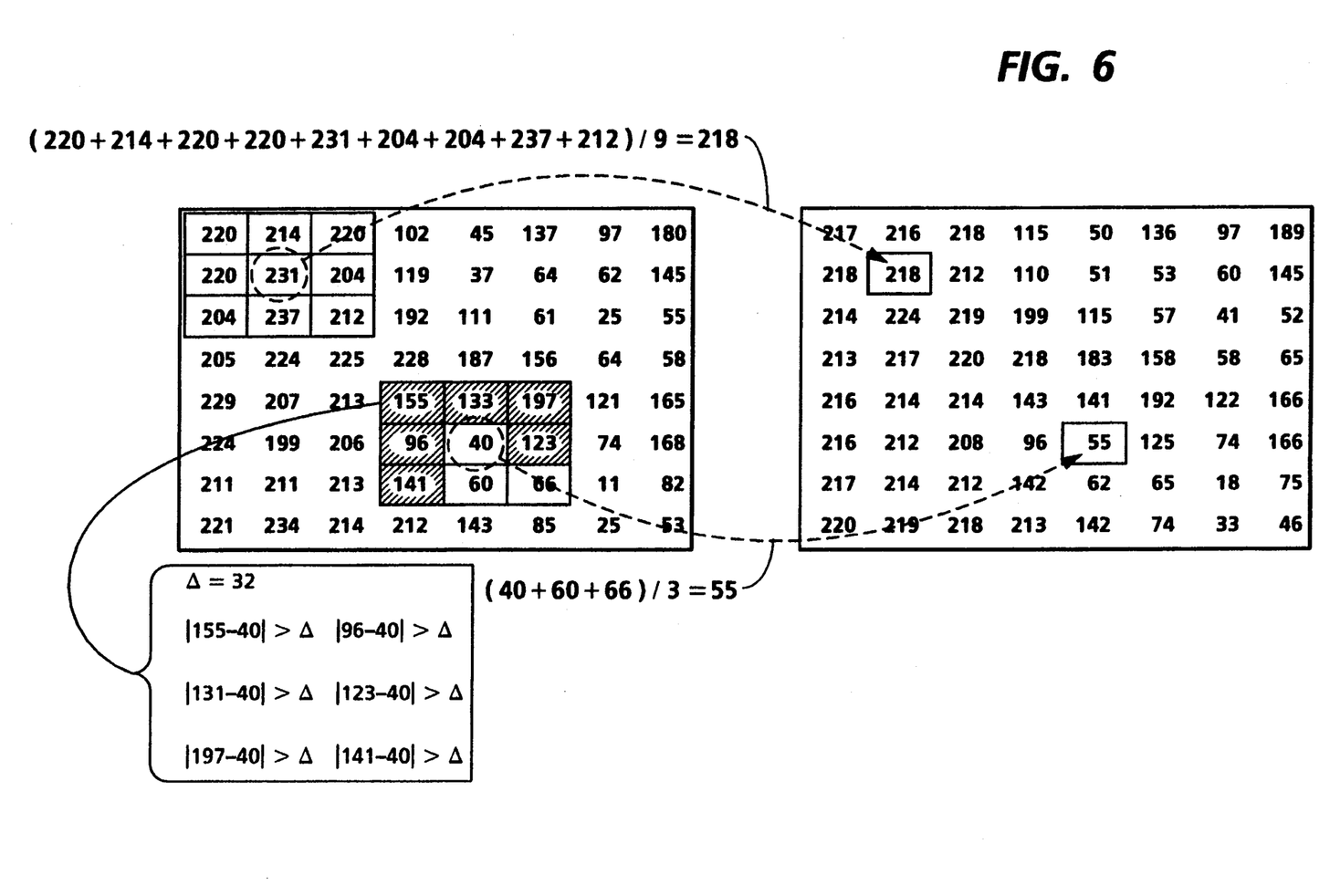
FIG. 6 shows effect of the edge-preserving lowpass filter used in the examples.

In our present example and with reference to FIG. 6, the sigma filter operates on the image using a noise value or delta of $\Delta = 32$ in this example. The pixel with value 231 is surrounded by pixels that do not deviate from this value by more than $\Delta$, and therefore, an output value 218 is derived by averaging over all 9 pixels in a 3×3 area. The pixel with value 40 is surrounded by pixels within the range as well as by pixels exceeding the range, resulting in an output value 55 generated by averaging over 3 pixels.

Figure 7A:
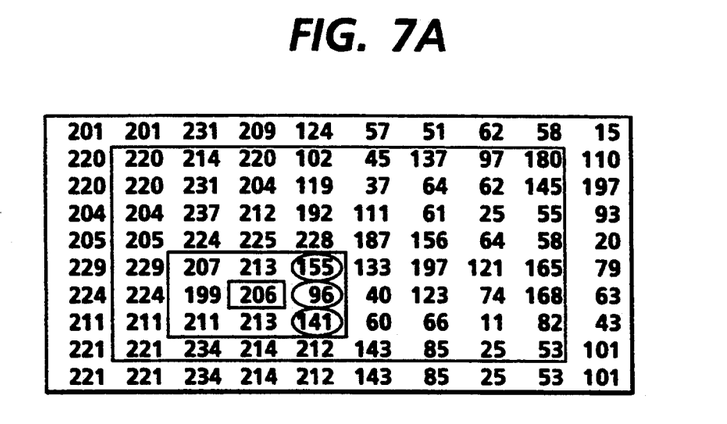
FIG. 7A shows one exemplar image block along with its neighborhood and the filter context.
Figure 7B:
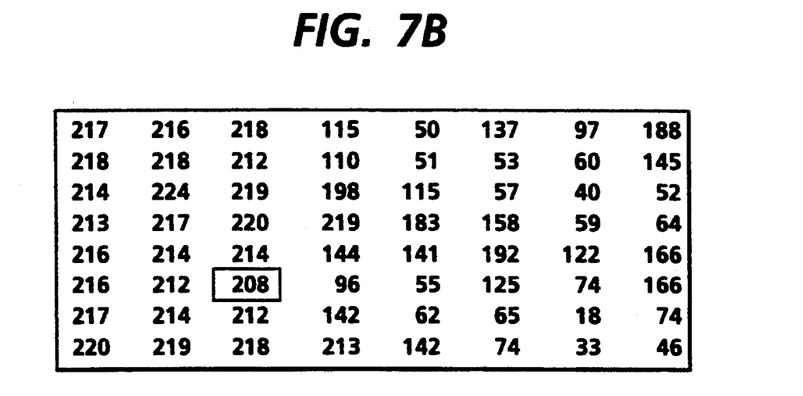
FIG. 7B shows the results of the filtering process on the image.

With reference now to FIG. 7A, a set of decompressed pixels and their gray values, in an 8×8 pixel block within a 10×10 pixel neighborhood is indicated by the black lines segregating the neighborhood from the remainder of the image, is shown. At borders of the image, we simply replicate pixels, and in FIG. 7A this is represented in the leftmost column and the bottom row. The sigma filter is represented as an averaging function performed over pixels in a 3×neighborhood that do not deviate from the center pixel by more than a value of 32. In FIG. 7A, values 155, 96, and 141 (all circled), deviate from the center pixel 206 (identified by a square) by more than a value of 32 (the noise value or $\Delta$). Applying this filter, a modified image is obtained from the gray level pixels, given in FIG. 7B and resulting in a new value of 208 (identified by a square) for the pixel.

Figure 7C:
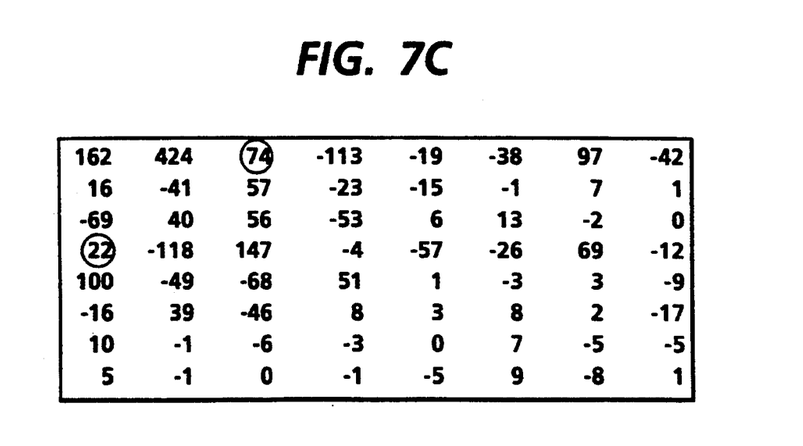
FIG. 7C shows the DCT transform of the image, the circles illustrating that the image is not within the set of possible images.
Figure 7D:
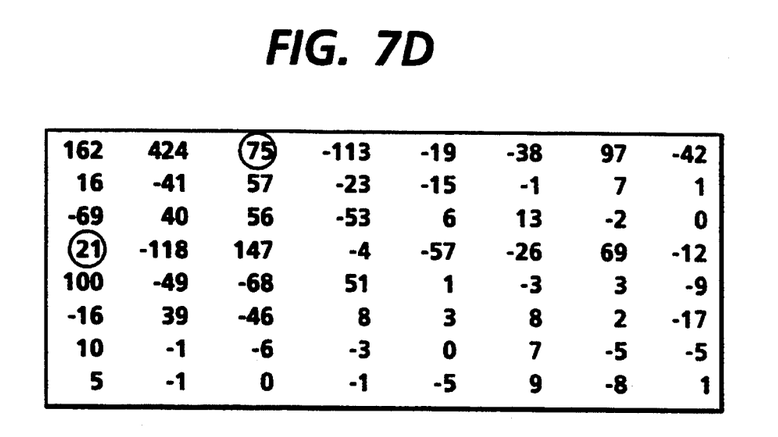
FIG. 7D shows an alteration to the DCT transform of the image.
Figure 7E:
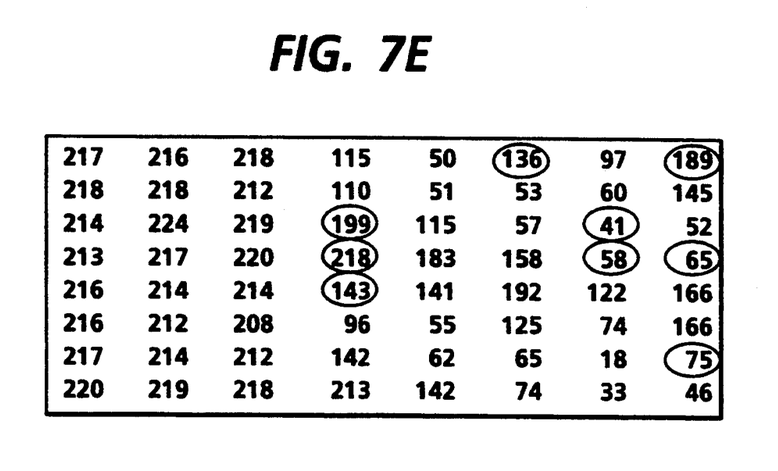
FIG. 7E shows the inverse transform of the altered DCT transform.

Having obtained a filtered image, which has attenuated the high frequency noise within the decompressed image, a comparison to the original image is obtained to assure fidelity with the original image. The DCT of the image is derived, shown in FIG. 7C. The results are directly compared with the original compressed image (compared, for example to DCT coefficient sets 110, 112, 114, and 116, and Q-Table 119, of FIG. 4B). Each position in the DCT set has a range of acceptable values, and in the example of FIG. 7C, the value at position 3,1 (value of 74 circled) is beyond the range of acceptable values earlier determined to be 75 to 84 by means of $8 = INT\{acceptable\ value \div 10 + \frac{1}{2}\}$, where '8' is the quantized DCT coefficient and '10' is the corresponding Q-Table entry. Accordingly, value 75 is substituted for value 74. In other words, the transform values have been altered so that the image which was outside the set of possible images, is now just within that set (see FIG. 5A and 5B). While a value just inside the acceptable range is selected in this example, experience may show that values at other positions in the range might also be suitable substitutes for out-of-range values. FIG. 7D shows the corrected DCT coefficient at position 3,1 with an additional modified entry at position 1,4 (circled). From FIGS. 7C and 7D it is clear, that a simple filtering of a decompressed image does not guarantee that the result of the filtering operation is an image that was a possible source image for the compressed data, thus generating an image that is in violation of the DCT data. The inverse transform of the altered DCT set is derived, and a set of gray image pixels is again obtained as shown in FIG. 7E. All pixels in FIG. 7E that have been altered in reference to FIG. 7B are again circled. It should be noted that the values given in FIG. 7E are the values of a possible original image, whereas two values given in FIG. 7B were in violation of acceptable DCT ranges.

The process of filtering the image, transforming to frequency space, comparing and altering the frequency space values, and retransforming back to gray image pixels may be reiterated a number of times. The number of iterations can be selected on a basis of no changes in the DCT transform (i.e., there is convergence). Alternatively, the process may be iterated until there are no further changes in the image (another type of convergence). In yet another alternative, the number of iterations set to a fixed number, or a fixed number can serve as an upper limit of iterations.

In the iterative process used, the noise estimate used in the filter may be changed for each iteration. That is, instead of assuming $\Delta = 32$ and using that value for each iteration, values of two thirds of $\Delta$ in the second iteration, and one third $\Delta$ in third iteration for a three iteration case, might be used. We also might filter and sharpen (applying a different filter) in sequential operations.

Now the image is a new one. First, it is noted that this image is a possible original image, which could have resulted in the compressed original image. Therefore, there is some fidelity to the original image. The image has been smoothed at least once to remove high frequency noise while enhancing or maintaining edges. The correction may have introduced changes in the image, but a compressed version of the filtered image has been compared to the original compressed image (the original possible set) to assure fidelity. The filtered image was corrected as required. It is assumed that the; corrected filtered image is better than the filtered image because it is in complete agreement with the range of possible images.

Figure 8:
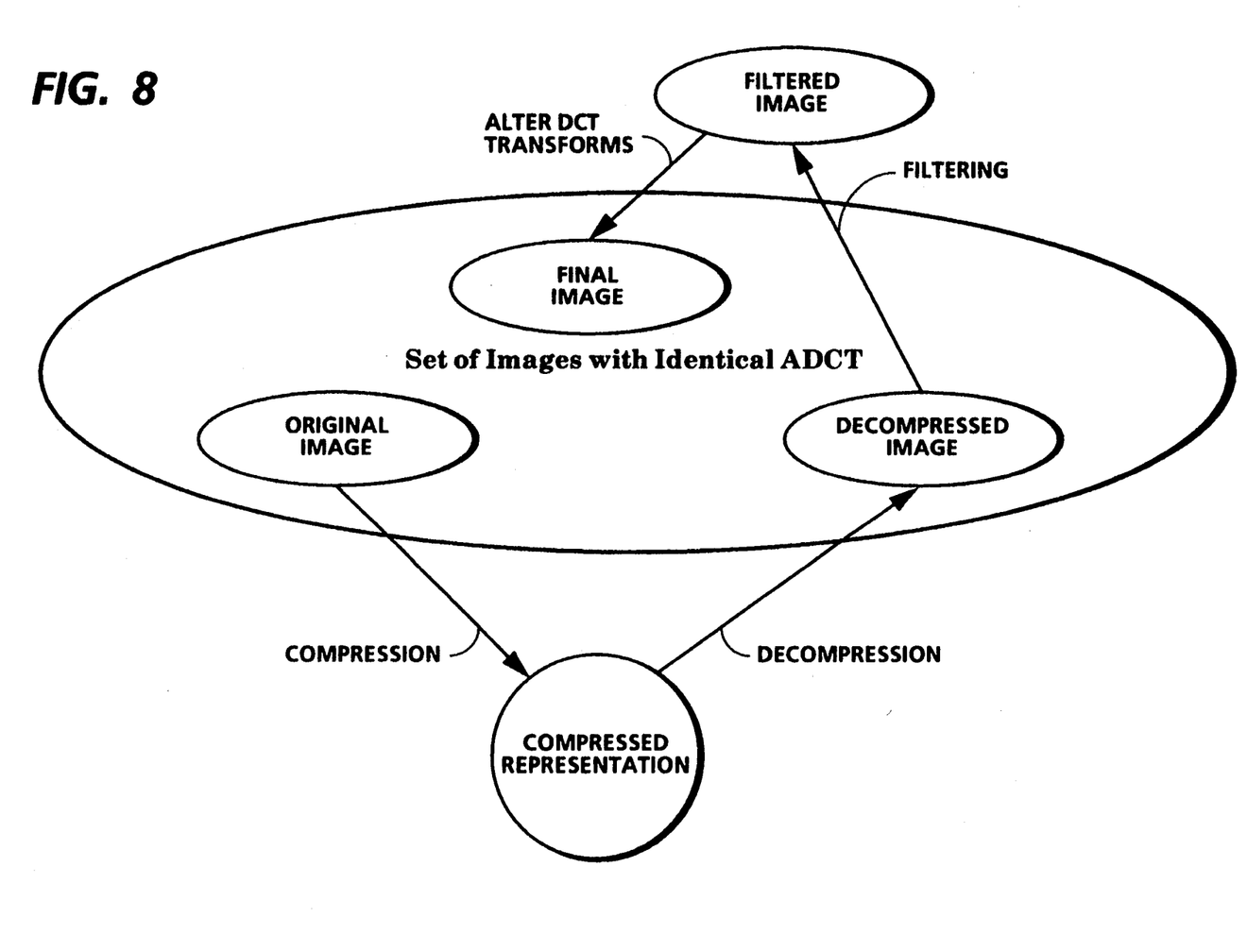
FIG. 8 shows a graphical representation of FIG. 7, where the filtered image lies outside the set of images with identical ADCT representations.

FIG. 8 illustrates the principal of the invention. The original image is compressed; the compressed representation is decompressed. The decompressed image is filtered to improve appearance, but in doing so, it is forced outside the range of images that are acceptable. The DCT representation of the image is therefore altered, in order to force the image into the acceptable range of images.

Figure 9:
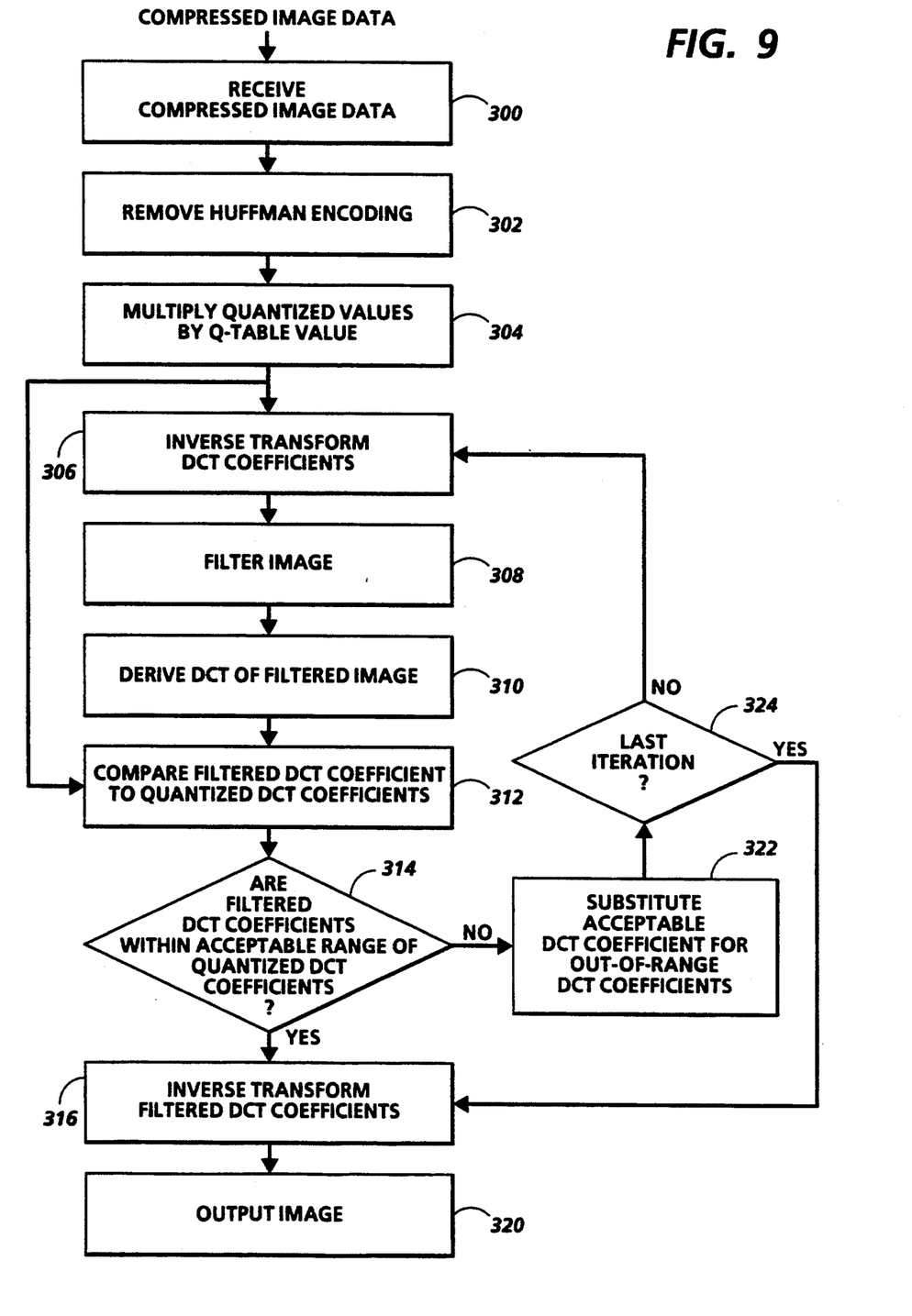
FIG. 9 shows a flow chart of the iterative decompression process forming the invention.

With reference now to FIG. 9, a flow chart of the inventive iterative ADCT decompression/reconstruction showing the additional operations of the present invention is provided. An image compressed in accordance with the ADCT compression method with statistical encoding is obtained at step 300. The statistical encoding is removed at step 302 to obtain quantized DCT coefficients. At step 304, the quantized DCT coefficients are multiplied by values in the Q table to obtain the set of DCT coefficients. At step 306, the inverse transform of the DCT coefficients is derived to produce the gray level image. Deviating from the normal process, at step 308 the 8×8 output block is filtered. At step 310, the filtered image output is used to generate a set of DCT coefficients. At step 312, the filtered image DCT coefficients are compared to the DCT coefficients obtained at step 312, and an acceptable range about each value. At step 314, if the filtered image DCT coefficients are within the acceptable range about each value, then at step 316, the inverse transform of the DCT coefficients is derived to produce the gray level image. At step 320, the gray image is directed to an output. If the filtered image DCT coefficients are not within the acceptable range about each value, then at step 322, acceptable values are substituted for out-of-range values, and the process is repeated from step 306. Not shown, a counter may be incremented to limit the number of iterations. If, at step 324 the limit of the iteration number is reached, the data is transferred to block 316 for subsequent output through block 320. This step guarantees that the output gray level image is a valid image for the compressed description received at block 300.

It should be noted that one specific filter type and one specific conflict resolution for the DCT coefficients was used in the examples. Clearly, different filters are possible, including general order statistic filters and "find-and-replace" filters. Also, the filter can be based on the local characteristics of the 8×8 block. An example is an edge preserving smoothing filter that uses a fraction of the dynamic range of the local 8×8 blocks, and/or the Q-matrix to determine the maximum noise variation encountered in the block. Another option for the manipulation in the image domain, in contrast to tile DCT domain, is the thresholding of data if a binary original is assumed. This assumption, however, has to be tested in a DCT domain and the thresholding should only be accepted if the DCT coefficients after thresholding are in agreement with the DCT coefficients before thresholding.

Different options exist for the conflict resolution of the DCT coefficients. Convergence speed can be improved by modifying the algorithm slightly. Possible modifications include, e.g., the addition of noise into the modified DCT coefficients. Finally, the number of iterations can be a function of the local 8×8 block characteristics rather than using a fixed number as used in the examples.

The invention has been described with reference to a particular embodiment. Modifications and alterations will occur to others upon reading and understanding this specification.

I claim:

1. A method of improving the appearance of a decompressed document image while maintaining fidelity with an original document image from which it is derived, wherein for compression, an original document image is divided into blocks of pixels, said blocks of pixels are changed into blocks of transform coefficients by a forward transform coding operation using a frequency space transform operation, said transform coefficients subsequently quantized with a lossy quantization process in which each transform coefficient is quantized according to a quantizing value from a quantization table and the result is used as a quantized transform coefficient, the method including the decompression steps of:
    a) receiving said quantized transform coefficient blocks for said original image;
    b) dequantizing the transform coefficients in a block according to a corresponding quantizing value from the quantization table to obtain a block of received transform coefficients;
    c) recovering the image by applying an inverse transform operation to the received transform coefficients;
    d) with a selected non-linear filter, reducing high frequency noise appearing in the recovered image as a result of the lossy quantization process, while preserving edges, whereby the appearance of the recovered image is rendered more visually appealing;
    e) changing the filtered recovered image into blocks of new transform coefficients by the forward transform coding operation using the frequency space transform compression operation;
    f) comparing each block of new transform coefficients to a corresponding block of received transform coefficients and the selected quantization table, to determine whether the filtered recovered image is derivable from the original image; and
    g) upon said determination transferring the filtered recovered image to an output buffer.

2. A method as described in claim 1, wherein step f) includes the additional steps of
    1) determining that the block of new transform coefficients is not derivable from the original image; and
    2) altering individual new transform coefficients, so that a block of altered new transform coefficients is derivable from the original image;
    3) recovering the image from the blocks of altered new transform coefficients.

3. A method as described in claim 1, wherein step f) includes the additional steps of
    1) determining that the block of new transform coefficients is not derivable from the original image; and 2) altering individual new transform coefficients, so that a block of altered new transform coefficients is derivable from the original image;
3) recovering the image from the blocks of altered new transform coefficients;
4) repeating steps d-f iteratively until a selected condition occurs.

4. A method as described in claim 1, wherein the forward transform coding operation using the frequency space transform operation is a discrete cosine transform.

5. A method as described in claim 1, wherein for compression, the quantized transform coefficients are further encoded with a lossless encoding method, and the additional step of removing any lossless encoding is provided prior to step b).

6. A method of improving the appearance of a decompressed document image while maintaining fidelity with an original document image from which it is derived, wherein for compression, an original document image is divided into blocks of pixels, said blocks of pixels are changed into blocks of transform coefficients by a forward transform coding operation using a frequency space transform operation, said transform coefficients subsequently quantized with a lossy quantization process in which each transform coefficient is quantized according to a quantizing value from a quantization table and the result is used as a quantized transform coefficient, and said blocks of quantized transform coefficients are encoded with a lossless encoding method, the method including the decompression steps of:

a) receiving said encoded quantized transform coefficient blocks for said original image;
  b) removing any lossless encoding of the quantized transform coefficient blocks for said original image;
  c) dequantizing the quantized transform coefficients in a block according to a quantization table to obtain a block of received transform coefficients;
  d) recovering the image by applying an inverse transform operation to the received transform coefficients;
  e) with a selected filter, reducing high frequency noise appearing in the recovered image as a result of the lossy quantization process, while preserving edges, whereby the appearance of the recovered image is rendered more visually appealing;
  f) changing the filtered recovered image into blocks of new transform coefficients by the forward transform coding operation using the frequency space transform compression operation;
  g) comparing each block of new transform coefficients to a corresponding block of received transform coefficients and the selected quantization table, to determine whether the filtered recovered image is derivable from the original image; and
  h) upon said determination transferring the filtered recovered image to an output buffer.

7. A method as described in claim 6, wherein step g) includes the additional steps of:
  1) determining that the block of new transform coefficients is not derivable from the original image; and
  2) altering individual new transform coefficients, so that a block of altered new transform coefficients is derivable from the original image;
  3) recovering the image from the blocks of altered new transform coefficients.

8. A method as described in claim 6, wherein step g) includes the additional steps of:
  1) determining that the block of new transform coefficients is not derivable from the original image; and
  2) altering individual new transform coefficients, so that a block of altered new transform coefficients is derivable from the original image;
  3) recovering the image from the blocks of altered new transform coefficients;
  4) repeating steps e-g iteratively until a selected condition occurs.

9. A method as described in claim 6, wherein the forward transform coding operation using the frequency space transform operation is a discrete cosine transform.

10. A method of improving the appearance of a decompressed document image while maintaining Fidelity with an original document image from which it is derived, wherein for compression, an original document image is divided into blocks of pixels, said blocks of pixels are changed into blocks of transform coefficients by a forward transform coding operation using a frequency space transform operation, said transform coefficients subsequently quantized with a lossy quantization process in which each transform coefficient is divided by a quantizing value from a quantization table and the integer portion of a result is used as a quantized transform coefficient, and said blocks of quantized transform coefficients are encoded with a lossless encoding method, the method including the decompression steps of:

a) receiving said encoded quantized transform coefficient blocks for said original image;
  b) removing any lossless encoding of the quantized transform coefficient blocks for said original image;
  c) multiplying each quantized transform coefficient in a block by a corresponding quantizing value from the quantization table to obtain a block of received transform coefficients;
  d) recovering the image by applying an inverse transform operation to the received transform coefficients;
  e) with a selected filter, reducing high frequency noise appearing in the recovered image as a result of the lossy quantization process, while preserving edges, whereby the appearance of the recovered image is rendered more visually appealing;
  f) changing the filtered recovered image into blocks of new transform coefficients by the forward transform coding operation using the frequency space transform compression operation;
  g) comparing each block of new transform coefficients to a corresponding block of received transform coefficients and the selected quantization table, to determine whether the filtered recovered image is derivable from the original image; and
  h) upon said determination transferring the filtered recovered image to an output buffer.

11. A method as described in claim 10, wherein step g) includes the additional steps of:
  1) determining that the block of new transform coefficients is not derivable from the original image; and
  2) altering individual new transform coefficients, so that a block of altered new transform coefficients is derivable from the original image;
  3) recovering the image from the blocks of altered new transform coefficients.

12. A method as described in claim 10, wherein step g) includes the additional steps of:
 1) determining that the block of new transform coefficients is not derivable from the original image; and
 2) altering individual new transform coefficients, so that a block of altered new transform coefficients is derivable from the original image;
 3) recovering the image from the blocks of altered new transform coefficients;
 4) repeating steps e-g iteratively until a selected condition occurs.

13. A method as described in claim 10, wherein the forward transform coding operation using the frequency space transform operation is a discrete cosine transform.

* * * * *